United States Patent Office 3,084,051
Patented Apr. 2, 1963

3,084,051
MEAT RELEASE COMPOSITIONS AND THE
USE OF SAME
Edward J. Bromstead and Yale Himelbloom, Waukegan,
Ill., assignors to Midland Industrial Finishes Company,
a corporation of Illinois
No Drawing. Filed Oct. 23, 1962, Ser. No. 232,590
12 Claims. (Cl. 99—187)

This invention relates to coating compositions for preventing the adhesion of proteinaceous meaty materials to the inside of metal cans, methods for preventing such adhesion, and metal having said coating compositions baked thereon.

This application is a continuation-in-part of our allowed copending application Serial No. 72,290, filed November 29, 1960, now abandoned.

In the manufacture of canned proteinaceous meaty marine or animal materials such as ham, potted meats, luncheon meats, fish, and the like, the metal cans (for example, aluminum or tin plated black iron having ¼ or ½ lb. of electro-tin) are filled with the meaty material, closed, sealed, and cooked. The cooking operation is frequently conducted for about 2 hours under pressure and at temperatures of about 250° F. or higher.

As a result of this process, particularly the cooking operation, the meaty material has a tendency to adhere to the interior surface of the can with which it is in contact. This adhesion makes it difficult to remove the meaty product from the can without tearing the meat, and causes the consumer considerable inconvenience and results in wastage.

In the past, many procedures have been tried and used, but they have met with limited success only. For example, paper has been used to separate the meat from the can. This treatment, however, utilizes a somewhat unsightly expedient, involves a separate and special process step to insert the paper into the can, and requires the separation of the paper from the meaty product. Further, a film of melted lard has been applied to inside surfaces of cans. Although lard is edible and is relatively inexpensive, it requires a separate and special application step, and has not been found to be uniformly dependable. Still further, the use of ethylene bis-stearamide has been proposed as a meat release agent. It has been found that in order to use this bis-stearamide as an effective meat release agent, it must be applied after the application of the lacquer or protective coating, which, of course, requires an additional processing step.

We have found an outstanding ethylene bis-amide meat release agent that prevents or inhibits the adhesion of proteinaceous meaty materials to the inside surface of the metal can in which they are cooked without introducing toxic, flavor, or odor conferring properties to the meat product. The release agent may be effectively applied in the form of a liquid coating to the surface of metal in combination with a compatible, deterioration-inhibiting, resinous coating base or vehicle. The base contains constituents that inhibit rusting, discoloration or staining of the metal, and damage to the metal by destructive constituents (e.g., sulfur and amino acids) present in or with the meaty product.

After the liquid coating is baked on to the metal, the coated metal may then be shaped or fabricated without having the baked-on coating break or flake-off, thereby destroying the effectiveness of the coating.

The meat release agent used in this invention is a substantially water-insoluble, synthetic solid product that has wax-like characteristics, has a melting point that is above 250° F., and is compatible with certain resinous deterioration-inhibiting coating bases or vehicles. A substantially homogeneous liquid admixture of the meat release agent and base may be applied to the surface of the sheet metal that is to be used in forming the cans so that the meat release agent exudes or "blooms" to the air-coating interface to form a surface film or exudate of meat release agent without destroying the firm adhesion of the base to the metal.

The meat release agent comprises a heat-exudative (i.e., exudes to the surface of the coating upon the application of heat to form a surface film or exudate) waxy ethylene bis-amide produced by reacting one mole of ethylene diamine with two moles of structurally modified fatty acids.

The admixture of modified fatty acids should have a $C_{18}$ average chain length, solubility characteristics similar to distilled tallow acids, and possess the titer and consistency of a tallow fatty acid, although for all practical purposes it is completely saturated.

The modified fatty acids that are reacted with the ethylene diamine are produced by first subjecting fatty acids derived from tall oil or from allow, or the like, to a polymerization process. The monomeric material remaining in the reaction mixture is then removed by distillation under vacuum, and thereafter hydrogenated. The product may be used as such or be blended with added hydrogenated fatty acids such as stearic and palmatic acids. The resulting admixture has the color and oxidation stability that are associated with the highest grades of saturated fatty acids. This process is broadly described in U.S. Patent 2,812,342.

The modified fatty acid product is available commercially. For example, "Emery Modified Fatty Acid F-996-S" is satisfactory. This particular product has a titer of about 45-50, and iodine value (Wijs) of about 2-3, about 98-99.5% free fatty acid (as oleic), a polyunsaturated acid content of about 0.0%, a total fatty acid value (as oleic) of about 104.5%, an unsaponification value of up to about 2.5%, and Lovibond color 5¼" cell values such as 1.1Y/0.5R, 1.5Y/1.3R, and 1.8R/3.0Y.

The meat release agent may be prepared by heating with agitation, 89.2% (3.14 moles) of the modified fatty acid product, such as the "F-996-S" acid, with 10.8% of an 85% solution (1.53 moles) of ethylenediamine. The temperature should be raised slowly to a maximum of about 300-380° F. In order to eliminate discoloration, an inert gas may be used. As the reaction progresses, water of reaction is removed by distillation. The reaction may be conducted over a period of about 4-7 hours until the wax has the desired acid value between about 5-20.

The resulting meat release product is commercially available as "Advawax 267." This particular product has a melting point of about 265-270° F., and the only commonly used commercial solvent in which it has been found soluble is hot ethyl alcohol.

We have found that particularly good results are obtained when the meat release agent is applied to the metal in combination with a liquid resinous protective base. The base should include a compatible combination of, in a volatile liquid organic vehicle, an epoxy resin, a heat-convertible nuclear substituted phenylaldehyde type resin product, and if desired, a polyvinyl acetal resin. All of these resins harden upon baking, the liquid vehicle volatilizes, and the meat release agent functions as an exudate. Some chemical reaction occurs among components of such bases during the baking step. In addition, a curing agent or catalyst, such as phosphoric acid, should be used, although its presence is not critical. A sulfur acceptor such as a finely divided aluminum pigment powder may also be included in the coating composition.

The epoxy resin present in the resinous protective base imparts flexibility, adhesion and corrosion resistance to the baked-on coating. The epoxy resin is a glycidyl ether of bis-phenol, and is of the type used with heat-reactive phenolic resins used in baked-on coatings. These resins contain reactive hydroxy and epoxy groups, have an epoxide equivalent of about 1,500–4,000, preferably about 2,000–3,000, and an average molecular weight of about 1,500–4,000, preferably about 2,000–3,500.

Epoxy resins produced by reacting bis-phenol-A with epichlorohydrin, such as "Epon 1007" and "Epon 1009" type resin, may be used in the base, although "Epon 1007" is preferred. "Epon 1007" is a solid having a melting point (Duran's mercury method) of 125–135° C., a viscosity (Gardner Holdt) in a 40% resin solution in butyl carbitol at 25° C., of Y–Z1 or 18–28 poises, a color (Gardner, 40% resin solution in butyl carbitol at 25° C.) of 5 max., and an epoxide equivalent (grams of resin containing one gram-equivalent of epoxide) of 2,000–2,500. "Epon 1009" is similar to "Epon 1007", but has a melting point of 145–155° C., a viscosity (Gardner-Holdt) in a 40% resin solution in butyl carbitol at 25° C., of Z2–Z5 or 38–100 poises, and an epoxide equivalent of 2,500–4,000.

A polyvinyl acetal resin may be used in the base to provide plasticizing properties, promote uniform liquid film flow on the metal surface, promote leveling of the coating, enhance the toughness, adhesion and flexibility of the baked-on coating. It may contain polyvinyl formal or polyvinyl butyral resins, the former resin being preferred. For example, "Formvar F7–70E", a polyvinyl formal resin, may be used. "Formvar F7–70E" is made from a polyvinyl acetate having a molar viscosity of 7.0 cps. and from which 70% of the acetate groups have been replaced with alcohol and formal groups. It is stabilized with a weak alkali such as ammonium hydroxide. Further, "Formvar F7–70E" is a free-flowing powder having an average molecular weight of about 21,000, a hydroxyl content (expressed as percent polyvinyl alcohol) of 5–7, an acetate content (expressed as percent polyvinyl acetate) of 40–50, a specific gravity of 1.2, and a viscosity (cps., determined with 5 g. resin made to 100 mil. with ethylene chloride, at 20° C.) of 8–10.

When a polyvinyl acetal resin is not used in the base, higher levels of the epoxy resin should be used.

The nuclear substituted phenyl-aldehyde resin used in the liquid base is a bake-on resin such as exemplified by the following heat-reactive or heat-hardenable resins: "Methylon 75202"; "Methylon 75108"; "Resinox–P–97"; "Varcum 2896–B"; "Durez Phenolic Resin 15956" and "RP–902". The nuclear substituted phenyl-aldehyde resin imparts good chemical resistance properties to the baked-on coating.

"Methylon 75202" is a preferred nuclear substituted phenyl-aldehyde resin and is a reaction product of a xylene-formaldehyde resin coreacted with a bisphenol epichlorohydrin type epoxy resin. It is sold as a 65% solids solution in combined solvents. It is polymeric in nature and of itself is an excellent film former. "Methylon 75202" is described in U.S. Patent 2,825,712.

"Methylon 75108" is an allyl ether of polymethylol phenol made by the reaction of phenol, formaldehyde, sodium hydroxide, and allyl chloride, with the subsequent production of sodium phenate with substitute methylol groups in the ortho and para positions, followed by the subsequent substitution of the sodium ion by an allyl group. It is essentially a monomeric material with an average of 2.1 methylol groups per molecule. It is sold as a 98% reactable material containing no solvent. "Methylon 75108" is described in U.S. Patents 2,579,329; 2,579,330; 2,579,331; 2,598,406; 2,606,929; 2,606,934; and 2,606,935.

"Resinox–P–97" is the reaction product of formaldehyde and methylene-bridged phenolic nuclei. "Resinox–P–97" contains 50% ±2% solids (ASTM D–115–41), 25% butanol, and 25% xylol. It has a viscosity (Gardner-Holdt) of A–H, a specific gravity (25° C.) of 0.985, a xylol tolerance (cc. of xylol tolerated by 1 gram of resin solution) of 1.0–2.0, a color that is straw to light amber, and a density of 8.2 lbs. per gallon.

"Varcum 2896–B" is a liquid resole type phenol-formaldehyde resin. "Varcum 2896–B" contains about 66–70% resin solids in butanol and diacetone alcohol solvents. It has a viscosity of 10,000–20,000 cps. and a specific gravity of 1.07–1.09, as determined in accordance with Varcum Test Procedures. These procedures substantially conform with accepted standard procedures.

"Durez Phenolic Resin 15956" is a liquid resole type phenol-formaldehyde resin in which most of the phenolic hydroxyl groups have been converted to allyl ether groups. Although conventional tests may show that this product has about 80–85% by weight solids, the remaining portion will copolymerize.

"RP–902" is an alkaline-condensed, heat-hardenable phenol-paraformaldehyde resin. It contains 40% solids in toluol and butanol.

Aluminum powder may be used in the base as a sulfur-acceptor. For example, "Aluminum Tinting Paste No. 222," may be used. This particular product contains about 65.5% non-volatile material and has a 325 mesh designation. "Alcoa Superfine Leaf-Free Paste 1594," with aluminum, may also be used. It contains about 63.5% non-volatile solids.

The liquid admixture of meat release agent and protective resinous base may be applied to the sheet metal material either as a spray or by the use of conventional coating rolls, followed by a baking step. When the liquid coating composition is applied by coating rolls, the composition should have a viscosity of about 15–60, preferably 25, sec., #4 Ford Cup at 77° F. The viscosity should be about 18–22, sec., #4 Ford Cup at 77° F., if it is applied to the metal as a spray. The liquid coating composition as applied to the metal should contain about 15–45%, preferably about 20–40%, by weight non-volatile materials.

It is essential that the liquid coating composition be applied to the metal in such a manner that the dry coating weighs about 1½–6 mgs. of baked-on coating per square inch of metal surface and contains about 5–20%, preferably about 7–18%, of the meat release agent. Amounts below about 5% do not provide meat release properties, whereas values above about 20% cause the meat release film or exudate to break and flake-off and tend to inhibit the firm adhesion of the resinous protective base material to the metal. We have found that particularly good results are obtained when the liquid coating composition comprising the meat release and base is baked for about 10–20 minutes at about 390–410° F. Excessive heating should be avoided so as to obviate producing a brittle coating.

Table I, below, shows various ranges of constituents that may be present in the baked-on coating. These components are present as solids in either combined or uncombined form.

TABLE I

*Compositions of Baked-On Coatings*

| Components | Satisfactory amounts (percent by weight) | Preferred amounts (percent by weight) |
| --- | --- | --- |
| Epoxy resin | 15–75 | 17–60 |
| Polyvinyl acetal resin | 0–30 | 0–25 |
| Heat-convertible nuclear substituted Phenyl-aldehyde resin | 4–75 | 5–40 |
| Phosphoric acid catalyst [1] (Based on 100% acid) | 0.1–1 | 0.1–0.75 |
| Heat-exudative, waxy amine meat release agent | 5–20 | 7–18 |

[1] The presence of an acid is preferred.

Example I, below, exemplifies a liquid coating composition that may be used in roll-coating sheet metal that is used in making cans for meaty products. However, before it is applied to the metal, the non-volatile content should be decreased from 35.5% by weight, as shown in Example I, to 25–32% non-volatiles. Example I also shows the percent by weight of the constituents in the liquid coating composition, but excluding the added volatile liquid materials or vehicles (i.e., ethanol, butanol, xylol, and diacetone alcohol), and the percent by weight of constituents in the baked-on coating that results from baking the liquid composition.

In preparing the liquid coating composition of Example I, some of the liquid volatile material is mixed with "Epon 1007," "Formvar F7–70E," "Methylon 75202," and phosphoric acid. The "Advawax 267" is then added, and the resulting admixture is ball-milled for about 6–24 hours. The admixture is then removed from the mill. The mill is rinsed with some of the liquid volatile material and the resulting wash is added to "Aluminum Tinting Paste No. 222" to break up the aluminum; the aluminum mix is then added to and mixed with the material that was first removed from the ball mill.

EXAMPLE I

| Constituents | Percent by weight constituents in liquid coating composition[1] | Percent by weight, excluding added nonreactive volatile materials | Percent by weight non-volatiles in baked-on coating |
| --- | --- | --- | --- |
| Added nonreactive volatile liquid materials | 64.5 | | |
| Ethanol (denatured) | 13.7 | | |
| Butanol | 10.4 | | |
| Xylol | 25.0 | | |
| Diacetone alcohol | 15.4 | | |
| Epon 1007 (solid) | 5.7 | 16.1 | 20.1 |
| Formvar F7–70E (solid) | 5.7 | 16.1 | 20.1 |
| Methylon 75202 (about 65% nonvolatile solids) | 11.6 | 32.7 | 26.6 |
| Phosphoric acid (85%) | 0.1 | 0.2 | [2]0.2 |
| Aluminum tinting paste #222 (about 65.5% non-volatile solids) | 8.7 | 24.5 | 20.0 |
| Advawax 267 (solid) | 3.7 | 10.4 | 13.0 |
| Total | 100.0 | 100.0 | 100.0 |

[1] Before the liquid coating is applied to the metal by coating rolls, the nonvolatile contents should be reduced to 25% by weight. This may be done by adding the specified volatile materials in the same proportions specified in Example I.
[2] Based on 100% phosphoric acid.

The ethanol constituent of Example I is an important member of the liquid coating composition, although it may be replaced by diacetone alcohol. These volatile constituents tend to solubilize the otherwise insoluble "Advawax 267" and serve to disperse "Advawax 267" in the liquid resinous base. The butanol and/or diacetone alcohol solvent constituents may be replaced in whole or in part by solvents such as cyclohexanone and isophorone. The xylol constituent is a diluent that is particularly well suited for roller-coating operations, and is low in cost; although it is not a solvent in our system, it is compatible with the system and permits the use of smaller amounts of more expensive solvent(s). "SC–150" may be used in place of xylol; it is a petroleum aromatic product having 93% aromatics, a mixed aniline point of 70° C., a flash point (Tag closed cup) of 150, a Kauri-Butanol value of 87, a distillation range of 363–415° F., and a specific gravity (60/60° F.) of 0.892. If the liquid coating composition is to be applied as a spray, toluol may be substituted for xylol for "SC–150."

If desired, the "Advawax 267" meat release agent may be dispersed with volatile material and shipped and stored as such. For example, 10–25% by weight (i.e, based upon the weight of "Advawax 267" plus ethanol or diacetone alcohol), preferably 18–23% by weight, "Advawax 267" may be added to 90–75% by weight (i.e., based on the weight of "Advawax 267" plus ethanol or diacetone alcohol), preferably 82–77% by weight, hot ethanol or hot diacetone alcohol, the hot admixture added to a ball mill and milled therein either with or without the other volatile materials for about 6–24 hours; the resulting substantially homogeneous, stable liquid dispersion maintains its stable and substantially homogeneous properties at room temperature (e.g., 68° F.). The dispersion may either be later added to the liquid resinous base or retained as such until the liquid coating composition is to be applied to metal. Excessive spewing of the wax during the baking step is avoided by adding the dispersion to the liquid resinous base immediately prior to the coating of the metal; this enables one to stock the coated metal sheets by stacking them on top of each other, without having the wax offset onto the uncoated metal surface of the overlying metal sheet.

Example II, below, exemplifies a liquid coating composition having a higher solids content than Example I, above, no polyvinyl acetal resin and a higher epoxy resin content. The composition of Example II includes about 9.4 parts by weight of Advawax 267, about 56.5 parts by weight of Epon 1007, about 5.9 parts by weight of RP–902, and a volatile, liquid, organic vehicle containing diacetone alcohol.

EXAMPLE II

| Constituents | Percent by weight constituents in liquid coating composition | Percent by weight excluding "added nonreactive volatile liquid materials" | Percent by weight non-volatile materials in baked-on coating |
| --- | --- | --- | --- |
| Added nonreactive volatile liquid materials | 56.03 | | |
| Diacetone alcohol | 32.92 | | |
| Isophorone | 10.67 | | |
| SC–150 | 10.98 | | |
| Toluol | 0.73 | | |
| Cellosolve acetate | 0.73 | | |
| Epon 1007 (solid) | 20.45 | 46.4 | 56.5 |
| RP–902 (about 40% non-volatile solids) | 5.41 | 12.3 | 5.95 |
| Phosphoric acid (85)% | 0.30 | 0.68 | [1]0.62 |
| N7-ethyl cellulose (15% non-volatile solids) | 1.01 | 2.29 | 0.41 |
| Alcoa Superfine Leaf-Free Paste 1594 with aluminum (about 63.5% non-volatile solids) | 10.00 | 22.8 | 17.55 |
| Titanium dioxide (rutile) | 3.49 | 7.97 | 9.60 |
| Advawax 267 (solid) | 3.32 | 7.56 | 9.37 |
| Total | 100.00 | 100.00 | 100.00 |

[1] Based on 100% phosphoric acid.

Example III, which follows, shows the percent by weight of constituents in a liquid coating, but the percentage values exclude added volatile materials that are not present in the baked-on coating.

EXAMPLE III

| Constituents | Percent by weight, excluding added volatile materials |
| --- | --- |
| Epon 1007 | 29.5 |
| Formvar F7–70E | 23.5 |
| Methylon 75202 | [1]31.0 |
| Phosphoric acid (85%) | [1]0.5 |
| Advawax 267 | 15.5 |
| Total | 100.0 |

[1] Excludes the volatiles that were present in the constituents prior to baking but were removed during baking.

The foregoing detailed description has been given for clearness of understanding only and no unnecessary limitations should be understood therefrom, as modifications will be obvious to those skilled in the art.

We claim:
1. A metal can having an inner baked-on coated surface and meaty proteinaceous food material therein, said coating firmly adhering to the inner metal surface of the can and having protective and meat releasing properties, said coating comprising a baked-on admixture of a meat release agent being in the form of an exudate and a resinous protective base, said exudate constituting about 5–20% by weight of said baked-on coating, being a synthetic, solid, waxy, heat-exudative, ethylene bis-amide meat release agent having a melting point above about 250° F. and an acid moiety of $C_{18}$ average chain length, and being soluble in hot alcohol, and said resinous protective base being a reaction product of about 15–75 parts by weight of an epoxy resin, about 0–30 parts by weight of a polyvinyl acetal resin, and about 4–75 parts by weight of a heat-hardenable nuclear substituted phenyl-aldehyde resin.

2. In a metal container in which meaty proteinaceous food material is cooked and retained, the improvement comprising about 1½–6 mg. of a baked-on coating per square inch of metal that firmly adheres to the inner surface of said container, said coating having protective and meat releasing properties and comprising a baked-on admixture of a meat release agent being in the form of an exudate and a resinous protective base, said exudate constituting about 5–20% of said baked-on coating, being a synthetic, solid, waxy, heat-exudative, ethylene bis-amide meat release agent having a melting point above about 250° F. and an acid moiety of $C_{18}$ average chain length, and being soluble in hot alcohol, and said resinous protective base being a reaction product of about 15–75 parts by weight of an epoxy resin, about 0–30 parts by weight of a polyvinyl acetal resin, and about 4–75 parts by weight of a heat-hardenable nuclear substituted phenyl-aldehyde resin.

3. In the method of preventing adhesion of meaty proteinaceous food material to the inner surfaces of metal containers in which said materials are to be cooked, the step comprising applying on a metal surface and then baking thereon, a compatible, substantially homogeneous, liquid coating composition having a heat-exudative meat release agent, a resinous protective base, and a volatile, liquid organic vehicle, said liquid coating composition having about 15–45% by weight non-volatiles and a viscosity of about 15–60 sec., #4 Ford Cup, said liquid coating composition comprising (a) about 5–20 parts by weight of a synthetic, solid, waxy, heat-exudative, ethylene bis-amide meat release agent having a melting point above about 250° F. and an acid moiety of $C_{18}$ average chain length, and being soluble in hot alcohol, (b) a resinous bake-on protective base having about 15–75 parts by weight of an epoxy resin, about 0–30 parts by weight of a polyvinyl acetal resin, and about 4–75 parts by weight of a heat-hardenable nuclear substituted phenyl-aldehyde resin, and (c) a volatile, liquid organic vehicle, said meat release agent forming a meat releasing exudate upon baking without destroying the firm adhesion of the resinous protective base to the metal and said baked-on coating weighing about 1½–6 mg. per square inch of coated metal and having about 5–20% of said exudate.

4. A compatible, substantially homogeneous, liquid coating composition for the interior surface of a metal container having a heat-exudative meat release agent, a resinous protective base, and a volatile, liquid organic vehicle, which composition comprises: (a) about 5–20 parts by weight of a synthetic, solid, waxy, heat-exudative, ethylene bis-amide meat release agent having a melting point above about 250° F. and an acid moiety of $C_{18}$ average chain length, and being soluble in hot alcohol; (b) a resinous bake-on protective base having about 15–75 parts by weight of an epoxy resin, about 0–30 parts by weight of a polyvinyl acetal resin, and about 4–75 parts by weight of a heat-hardenable nuclear substituted phenyl-aldehyde resin; and (c) a volatile, liquid organic vehicle.

5. A compatible, substantially homogeneous, liquid coating composition for the interior surface of a metal container having a heat-exudative meat release agent, a resinous protective base, and a volatile liquid organic vehicle, which composition comprises: (a) about 7–18 parts by weight of a synthetic, solid, waxy, heat-exudative, ethylene bis-amide meat release agent having a melting point above about 250° F. and an acid moiety of $C_{18}$ average chain length, and being soluble in hot alcohol; (b) a resinous bake-on protective base having about 17–60 parts by weight of an epoxy resin, about 0–25 parts by weight of a polyvinyl acetal resin, and about 5–40 parts by weight of a heat-hardenable nuclear substituted phenyl-aldehyde resin; and (c) a volatile, liquid, organic vehicle.

6. A compatible, substantially homogeneous, liquid coating composition for the interior surface of a metal container having a heat-exudative meat release agent, a resinous protective base, and a volatile, liquid organic vehicle, which composition comprises: (a) about 13 parts by weight of a synthetic, solid, waxy, heat-exudative, ethylene bis-amide meat release agent having a melting point above about 250° F. and an acid moiety of $C_{18}$ average chain length, and being soluble in hot alcohol; (b) a resinous bake-on protective base having about 20.1 parts by weight of an epoxy resin and an epoxide equivalent of about 2,000–3,500, about 20.1 parts of a polyvinyl formal resin, and about 26.6 parts by weight of a heat-hardenable xylene-formaldehyde-epichlorohydrin resin; and (c) a volatile, liquid, organic vehicle containing ethyl alcohol.

7. A compatible, substantially homogeneous, liquid coating composition for the interior surface of a metal container having a heat-exudative meat release agent, a resinous protective base, and a volatile, liquid organic vehicle, which composition comprises: (a) about 9.4 parts by weight of a synthetic, solid, waxy, heat-exudative, ethylene bis-amide meat release agent having a melting point above about 250° F. and an acid moiety of $C_{18}$ average chain length, and being soluble in hot alcohol; (b) a resinous bake-on protective base having about 56.5 parts by weight of an epoxy resin and an epoxide equivalent of about 2,000–3,500, and about 5.9 parts by weight of heat-hardenable phenol-aldehyde resin; and (c) a volatile, liquid, organic vehicle containing diacetone alcohol.

8. A method of producing a substantially homogeneous, stable liquid dispersion of a synthetic, solid, waxy, heat-exudative, ethylene bis-amide meat release agent having a melting point above about 250° F. and an acid moiety of $C_{18}$ average chain length, which comprises adding 10–25° by weight of said solid meat release agent to 90–75% by weight of hot solubilizing alcohol wherein said percentages are based on said meat release agent plus said hot ethanol, to form an admixture, ball-milling the admixture for at least about 6 hours to produce a susbtantially homogeneous, stable liquid dispersion of said solid, heat-exudative meat release agent that maintains these properties at room temperature.

9. The method of claim 8 wherein 18–23% by weight of said solid meat release agent is added to 82–77% by weight of a member of the group consisting of hot ethanol and hot diacetone alcohol.

10. A substantially homogeneous, stable liquid dispersion having said properties at ambient temperature comprising 10–25 parts by weight of a synthetic, solid, waxy, heat-exudative, ethylene bis-amide meat release agent having a melting point above about 250° F. and an acid moiety of $C_{18}$ average chain length, and 90–75 parts by weight of a solubilizing alcohol.

11. The product of claim 10 containing 18–23% of said solid meat release and 82–77% of a member consisting of diacetone alcohol and ethanol.

12. The product of claim 10 wherein the alcohol is a member of the group consisting of ethanol and diacetone alcohol.

References Cited in the file of this patent

UNITED STATES PATENTS

| | | |
|---|---|---|
| 2,735,354 | Edgar et al. | Feb. 21, 1956 |
| 2,800,410 | Edgar et al. | July 23, 1957 |
| 2,812,342 | Peters | Nov. 5, 1957 |

UNITED STATES PATENT OFFICE
CERTIFICATE OF CORRECTION

Patent No. 3,084,051                            April 2, 1963

Edward J. Bromstead et al.

It is hereby certified that error appears in the above numbered patent requiring correction and that the said Letters Patent should read as corrected below.

Column 2, lines 26 and 27, for "palmatic" read -- palmitic --; column 6, in the table for "EXAMPLE II", first column, line 11 thereof, for "(85)%" read -- (85%) --; column 8, line 45, for "10-25°" read -- 10-25% --; line 49, for "susbtantially" read -- substantially --.

Signed and sealed this 5th day of November 1963.

(SEAL)
Attest:

ERNEST W. SWIDER
Attesting Officer

EDWIN L. REYNOLDS
Acting Commissioner of Patents